US011859576B2

(12) United States Patent
Rexavier

(10) Patent No.: US 11,859,576 B2
(45) Date of Patent: Jan. 2, 2024

(54) CYLINDER HEAD ASSEMBLY HAVING FUEL INJECTOR SLEEVE FOR MID-DECK REACTING OF INJECTOR CLAMPING LOAD

(71) Applicant: Progress Rail Locomotive Inc., LaGrange, IL (US)

(72) Inventor: Raji Rexavier, Plainfield, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 0 days.

(21) Appl. No.: 17/840,306

(22) Filed: Jun. 14, 2022

(65) Prior Publication Data

US 2023/0129922 A1 Apr. 27, 2023

Related U.S. Application Data

(62) Division of application No. 17/511,474, filed on Oct. 26, 2021, now Pat. No. 11,566,580.

(51) Int. Cl.
*F02F 1/40* (2006.01)
*F02F 1/42* (2006.01)
(Continued)

(52) U.S. Cl.
CPC .................. *F02F 1/40* (2013.01); *F01P 3/16* (2013.01); *F02F 1/4214* (2013.01); *F02M 61/14* (2013.01);
(Continued)

(58) Field of Classification Search
CPC .... F02F 1/36; F02F 1/40; F02F 1/4214; F02F 1/242; F02F 11/002; F02F 2001/247; F02M 61/14; F02M 61/167; F02M 61/168; F02M 2200/8053; F02M 2200/805; F01P 3/00; F01P 3/16
See application file for complete search history.

(56) References Cited

U.S. PATENT DOCUMENTS 3,353,522 A 11/1967 Ley
5,295,462 A 3/1994 Barnes
(Continued)

FOREIGN PATENT DOCUMENTS

CN 105899797 A * 8/2016 ................ F02F 1/24
CN 111058959 A * 4/2020 .............. F02F 1/242
(Continued)

OTHER PUBLICATIONS

Written Opinion and International Search Report for Int'l. Patent Appln. No. PCT/US2022/045718, dated Jan. 27, 2023 (11 pgs).

*Primary Examiner* — Grant Moubry

(57) ABSTRACT

A cylinder head assembly includes a cylinder head casting, and an injector sleeve within an injector bore in the cylinder head casting. The injector sleeve includes a first sleeve end, and an injector clamping surface formed by an inner sleeve surface adjacent to a cylindrical second sleeve end. The injector sleeve further includes a sleeve clamping surface in contact with an upward facing middle deck surface of the cylinder head casting, and a reaction wall extending between the injector clamping surface and the sleeve clamping surface to transfer an injector clamping load to the upward facing middle deck surface.

16 Claims, 5 Drawing Sheets

(51) Int. Cl.

| | |
|---|---|
| ***F02M 61/14*** | (2006.01) |
| ***F02M 61/16*** | (2006.01) |
| ***F01P 3/16*** | (2006.01) |
| *F02F 1/24* | (2006.01) |

(52) U.S. Cl.
CPC ..... *F02M 61/168* (2013.01); *F02F 2001/247* (2013.01); *F02M 2200/8053* (2013.01)

(56) References Cited

U.S. PATENT DOCUMENTS

| | | | | |
|---|---|---|---|---|
| 5,345,913 | A | 9/1994 | Belshaw | |
| 6,112,722 | A | 9/2000 | Barnhart | |
| 6,119,658 | A * | 9/2000 | Jehle | F02M 61/14 123/41.31 |
| 8,899,207 | B2 | 12/2014 | Megel | |
| 8,960,156 | B2 | 2/2015 | Martinsson | |
| 9,593,654 | B2 | 3/2017 | Martinsson | |
| 2004/0139933 | A1 * | 7/2004 | Obermayer | F01P 3/16 123/193.5 |
| 2005/0229875 | A1 * | 10/2005 | Maassen | F02F 1/40 123/41.82 R |
| 2012/0217323 | A1 | 8/2012 | Martinsson et al. | |
| 2015/0007784 | A1 | 1/2015 | MacVicar | |
| 2016/0290279 | A1 * | 10/2016 | Brunner | F02F 1/24 |
| 2021/0156349 | A1 | 5/2021 | Perr | |

FOREIGN PATENT DOCUMENTS

| | | | |
|---|---|---|---|
| JP | 5454726 | U | 4/1979 |
| JP | 0674041 | B2 | 9/1994 |

* cited by examiner

CYLINDER HEAD ASSEMBLY HAVING FUEL INJECTOR SLEEVE FOR MID-DECK REACTING OF INJECTOR CLAMPING LOAD

TECHNICAL FIELD

The present disclosure relates generally to a cylinder head assembly, and more particularly to an injector sleeve in a cylinder head assembly having a sleeve clamping surface in contact with a deck surface to transfer an injector clamping load to a middle deck in the cylinder head casting.

BACKGROUND

Internal combustion engines are widely used throughout the world in applications ranging from vehicle propulsion to operation of pumps, compressors, all manner of industrial equipment, and production of electrical power. A typical engine construction includes a cylinder block, commonly equipped with cylinder liners each forming, together with a piston and a cylinder head, a combustion chamber. Fluid pressure in the combustion chambers is increased by action of the piston, and air and fuel ignited therein to produce a rapid pressure and temperature rise that drives the piston to rotate a crankshaft. In compression-ignition engines, commonly operated on a diesel distillate fuel, the fluids within each combustion chamber are compressed to an auto-ignition threshold, whereas in spark-ignited engines a typically less highly pressurized mixture is ignited by way of an electrical spark. Compression-ignition engines are typically although not exclusively built for heavier duty applications.

In one compression-ignition engine design individual power modules including a cylinder liner, a cylinder head section, and a water jacket are supported by an engine block, and arranged to couple to a common crankshaft. In certain medium speed engines, a typical design includes a cylinder head having a fire deck and a top deck physically separated around a fuel injector to ensure adequate cooling is provided to a center of the cylinder head. Such a design structure typically requires a separate fuel injector sleeve to be inserted in the cylinder head to isolate a fuel injector from engine coolant circulated through the cylinder head. A typical fuel injector sleeve design extends from a mid-deck region of the cylinder head to the fire deck, the bottom part of the cylinder head exposed to the combustion chamber. Such configurations generally require the clamping loads from fuel injector retention to be transferred to the fire deck region of the cylinder head. The fire deck region experiences high thermal loads and high pressure forces. The additional clamping loads on the injector sleeve can be detrimental to fatigue life of the cylinder head. The fuel injector is typically held in place by a component called an injector crab or crab clamp. The clamp urges the injector down toward the fire deck against the installed fuel injector sleeve, to thus withstand firing pressures acting upwards from combustion of fuel and air in the associated combustion chamber. For the configuration to be stable, the downward clamping force may be several times the net upward force. One known design generally along these lines is set forth in U.S. Pat. No. 5,345,913. In the '913 patent the force from the injector crab is transferred through the injector body to the conical interface between the injector and the injector sleeve. The injector sleeve in turn transfers the clamping force into the fire deck. Known configurations provide ample room for improvement and development of alternative strategies.

SUMMARY

In one aspect, a cylinder head assembly includes a cylinder head casting having a top deck surface, a fire deck having a lower fire deck surface, and an upward facing middle deck surface. The cylinder head casting has formed therein a coolant cavity, and an injector bore fluidly connected to the coolant cavity. The cylinder head assembly further includes an injector sleeve within the injector bore, and having an outer sleeve surface, and an inner sleeve surface extending circumferentially around a longitudinal axis and axially from a first sleeve end to a cylindrical second sleeve end extending through the fire deck. The inner sleeve surface further includes an injector clamping surface adjacent to the cylindrical second sleeve end. The injector sleeve further includes a sleeve clamping surface in contact with the upward facing middle deck surface, and a reaction wall extending axially between the injector clamping surface and the sleeve clamping surface to transfer an injector clamping load to the upward facing middle deck surface.

In another aspect, a cylinder head includes a cylinder head casting having a top deck surface, a fire deck having a lower fire deck surface, and a middle deck. The cylinder head casting further has formed therein a coolant cavity extending around an exhaust conduit and an intake conduit each extending through the fire deck, and an injector bore. The injector bore includes a cylindrical upper bore section formed by an injector well extending downwardly from the top deck surface to the coolant cavity, a sleeve tip hole extending through the fire deck, and a cylindrical middle bore section extending upwardly from the sleeve tip hole and terminating at an upward facing middle deck surface. The upper bore section, the middle bore section, and the sleeve tip hole are arranged coaxially about a bore center axis. The upward facing middle deck surface extends circumferentially and discontinuously around the bore center axis, and a plurality of coolant feed openings are each formed in part by discontinuities in the upward facing middle deck surface and fluidly connect the middle bore section to the coolant cavity.

In still another aspect, a fuel injector sleeve includes an elongate sleeve body having an outer sleeve surface, and an inner sleeve surface extending circumferentially around a longitudinal axis and forming an injector socket extending axially from a first sleeve end to a cylindrical second sleeve end forming an injector tip hole. The inner sleeve surface further includes a conical injector clamping surface adjacent to the cylindrical second sleeve end. The elongate sleeve body further includes a radially outward shoulder having a sleeve clamping surface formed thereon and facing a direction of the cylindrical second sleeve end, and a straight cylindrical wall extending from the radially outward shoulder in a direction of the cylindrical second sleeve end. The elongate sleeve body further includes a reaction wall having the conical injector clamping surface formed thereon and extending transversely to the longitudinal axis from the cylindrical second sleeve to the straight cylindrical wall.

DETAILED DESCRIPTION

Figure 1:
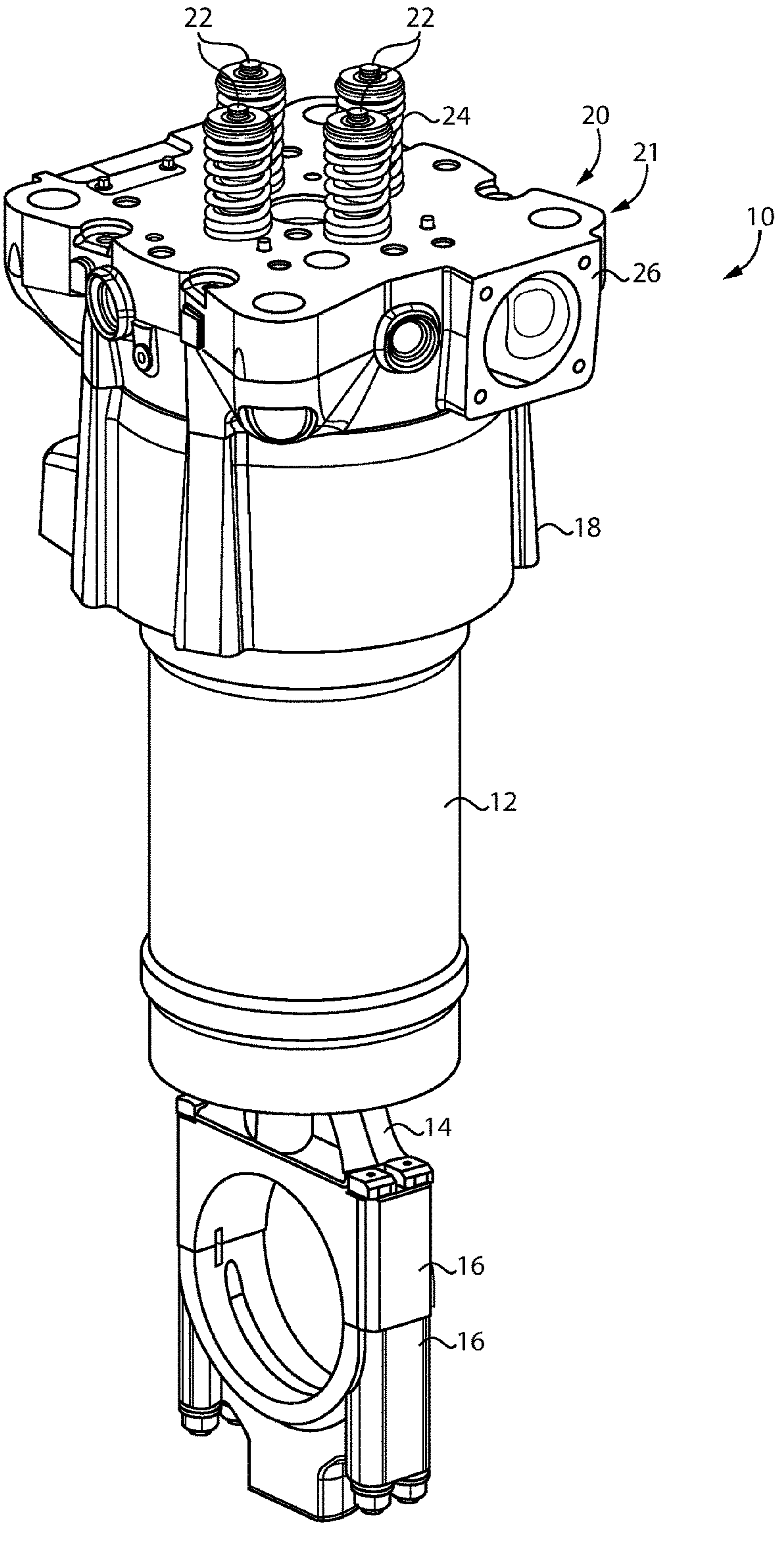
FIG. 1 is a diagrammatic view of a power module for an internal combustion engine, according to one embodiment.

Referring to FIG. 1, there is shown a power module 10 for an internal combustion engine. Power module 10 may include a cylinder liner 12 and a connecting rod 14 and cap 16, coupled with a piston (not shown) positioned within cylinder liner 12. Power module 10 may also include a cylinder head assembly 20 having a cylinder head 21 including a cylinder head casting 26. A water jacket 18 may be attached to cylinder head 21 and extends around cylinder liner 12 to provide a flow of a liquid engine coolant such as a mixture of water and conventional engine coolant around cylinder liner 12 and into cylinder head 21. A combustion chamber not visible in FIG. 1 is formed by cylinder head 21, cylinder liner 12, and the piston therein. In a practical implementation strategy power module 10 may be one of several power modules supported in a cylinder block, for instance, in a V-configuration. Other configurations such as an inline configuration are within the scope of the present disclosure. Power module 10 may be used in an internal combustion engine in a wide variety of applications, including vehicle propulsion, electric power generation, operation of a pump, compressor, or various others. In one embodiment, power module 10 is one of several power modules in an internal combustion engine system in a locomotive.

Cylinder head 21 and cylinder head casting 26, referred to at times interchangeably herein, may be formed of a single piece of casted metallic material such as an iron or a steel, or potentially an aluminum material. A plurality of engine valves 22 each associated with a valve return spring 24 are supported in cylinder head casting 26 and operable to control fluid communication between a combustion chamber in power module 10 and an intake system and exhaust system in a generally conventional manner. Power module 10 and the associated engine may be operated in a conventional fourcycle pattern, although the present disclosure is not thereby limited. Engine coolant conveyed through cylinder head casting 26 can exchange heat with material of cylinder head casting 26 and associated components, including a fuel injector and a fuel injector sleeve to be described. As explained above, cylinder heads in certain applications can experience various thermal and mechanical fatigue phenomena. As will be further apparent from the following description, cylinder head assembly 20 is structured for improved performance with regard to heat rejection and extended cylinder head fatigue life.

Figure 2:
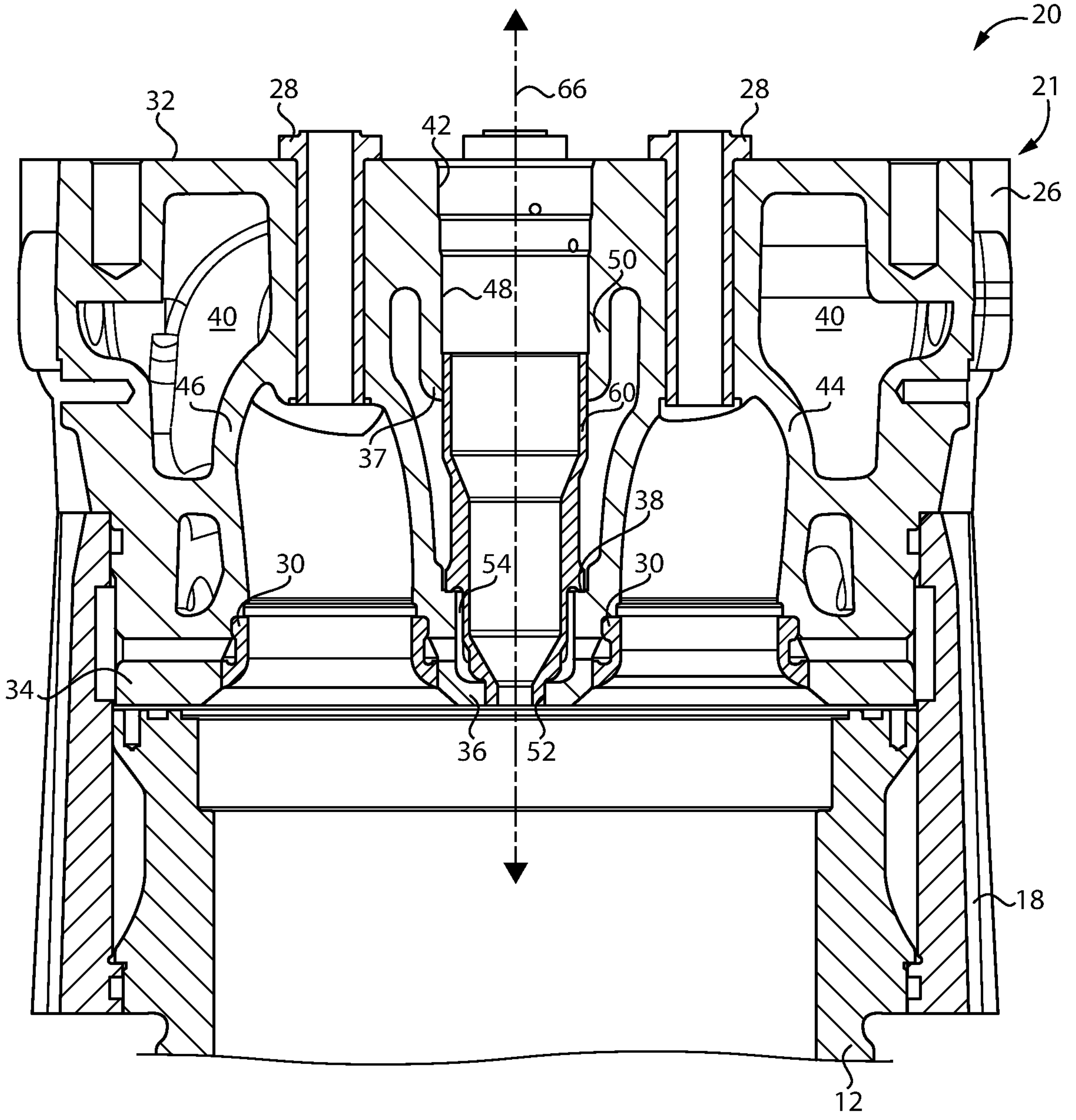
FIG. 2 is a sectioned side diagrammatic view of portions of the power module of FIG. 1.

Referring also now to FIG. 2, there are shown features of cylinder head assembly 20 in further detail. Valve stem inserts 28 may be resident in cylinder head 21 and structured to support and guide engine valves in a generally conventional manner. Valve seat inserts 30 may also be installed in cylinder head 21 also in a generally conventional manner. It is contemplated that cylinder head assembly 20 when coupled with other components of power module 10 may include two exhaust valves and two intake valves, although the present disclosure is not thereby limited. Cylinder head casting 26 also includes a top deck surface 32 to which a valve cover (not shown) may be attached, a fire deck 34 having a lower fire deck surface 36 exposed to combustion gases, and a middle deck 37 including an upward facing middle deck surface 38. Cylinder head casting 26 further has formed therein a coolant cavity 40 to convey a flow of engine coolant supplied by way of water jacket 18, and an injector bore 42 fluidly connected to coolant cavity 40. In cylinder head casting 26 coolant cavity 40 extends around an exhaust conduit 44 and an intake conduit 46 each extending through fire deck 34. Exhaust conduit 44 may be one of two exhaust conduits, fluidly connecting to an exhaust manifold (not shown), and intake conduit 46 may be one of two intake conduits fluidly connecting to an intake manifold (not shown).

Injector bore 42 may include a cylindrical upper bore section 48 formed by an injector well 50 extending downwardly from top deck surface 32 to coolant cavity 40. Injector bore 42 may also include a sleeve tip hole 52, cylindrical in shape, extending through fire deck 34, and a cylindrical middle bore section 54 formed by a cylindrical surface 55 extending upwardly from sleeve tip hole 52 and terminating at upward facing middle deck surface 38. Upper bore section 48, middle bore section 54, and sleeve tip hole 52 may be arranged coaxially about a bore center axis 66.

Figure 3:
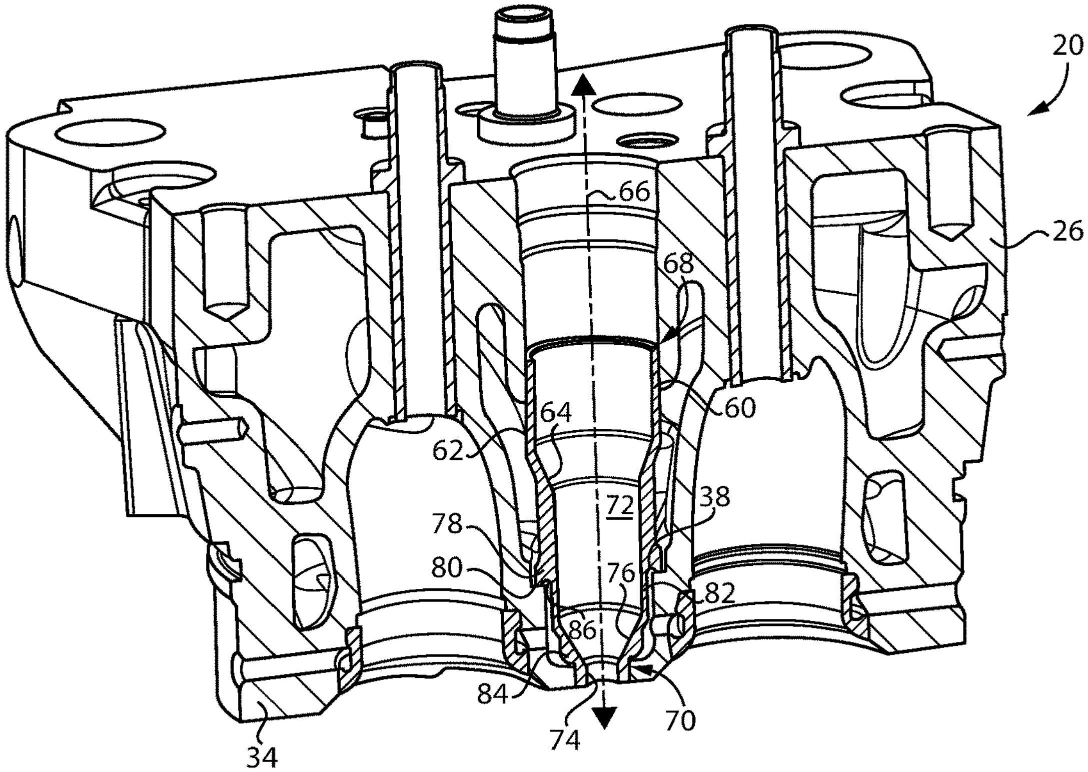
FIG. 3 is a sectioned view of a cylinder head assembly for use in an engine power module, according to one embodiment.

Referring also now to FIG. 3, cylinder head assembly 20 may further include an injector sleeve 60 within injector bore 42, and including an outer sleeve surface 62, and an inner sleeve surface 64 extending circumferentially around a longitudinal axis 66, commonly labeled with bore center axis 66, and axially from a first sleeve end 68 to a cylindrical second sleeve end 70 within sleeve tip hole 52 and extending through fire deck 34. Cylindrical second sleeve end 70 may include a sleeve tip (not numbered), generally arranged close to, and typically parallel to, lower fire deck surface 36, and exposed to combustion gases. Cylindrical second sleeve end 70 may be interference-fitted with cylinder head casting 26 within sleeve tip hole 52 and thereby forms a coolant and combustion seal.

Figure 4:
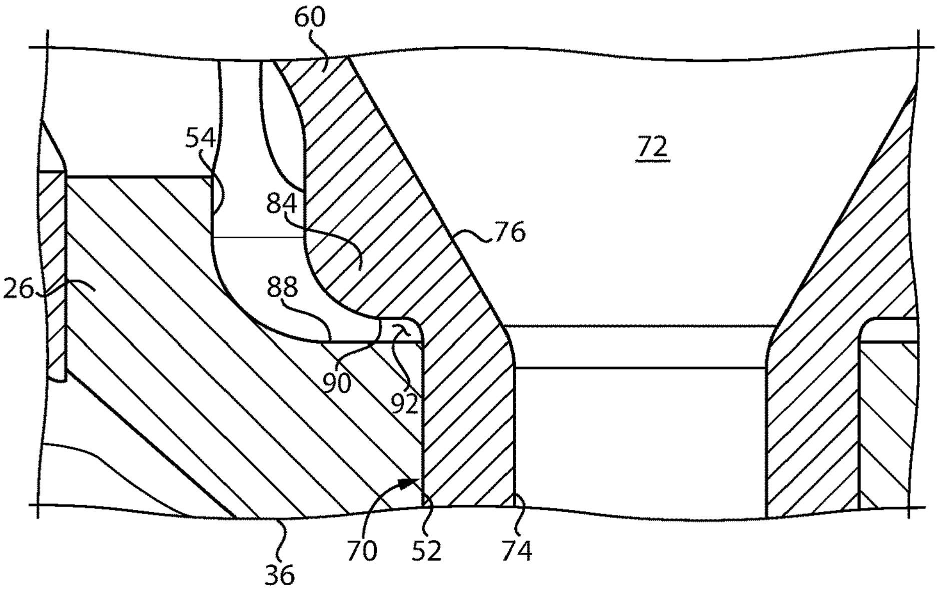
FIG. 4 is a sectioned side diagrammatic view of a portion of the cylinder head assembly as in FIG. 3.
Figure 6:
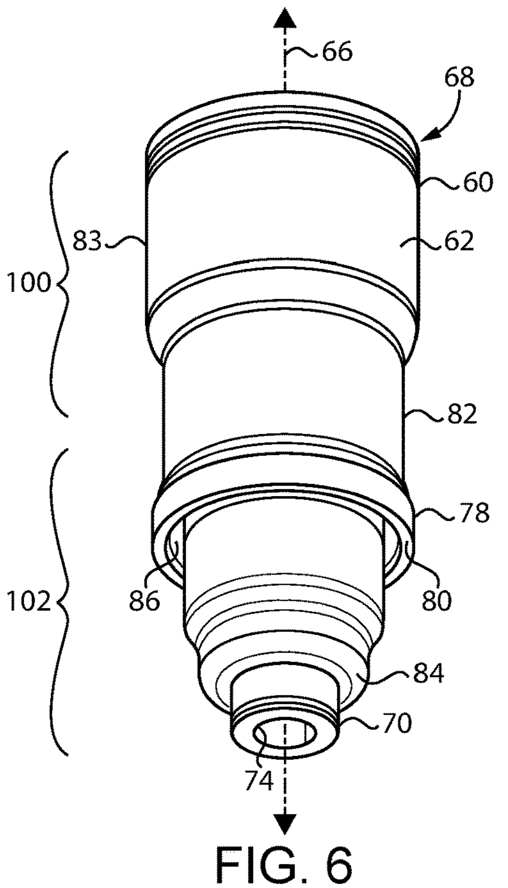
FIG. 6 is a diagrammatic view of a fuel injector sleeve, according to one embodiment.

Referring also now to FIG. 4, fuel injector sleeve 60 is further understood to include an elongate sleeve body also labeled with reference numeral 60, and including outer sleeve surface 62 and inner sleeve surface 64. Inner sleeve surface 64 forms an injector socket 72 sized and shaped to accept a fuel injector and extending axially from first sleeve end 68 to cylindrical second sleeve end 70 that forms injector tip hole 74. Inner sleeve surface 64 may further include an injector clamping surface 76 adjacent to cylindrical second sleeve end 70. Injector clamping surface 76 may include a conical injector clamping surface 76 in some embodiments. Elongate sleeve body 60 may further include a radially outward shoulder 78 having a sleeve clamping surface 80 formed thereon and facing a direction of cylindrical second sleeve end 70. Outer sleeve surface 62 forms a wetted wall of coolant cavity 40 at a location axially between radially outward shoulder 78 and first sleeve end 68. Elongate sleeve body 60 may further include a straight cylindrical wall 82 extending from radially outward shoulder 78 in a direction of cylindrical second sleeve end 70. Referring also now to FIG. 6, a second straight cylindrical wall 83 may extend upwardly from radially outward shoulder 78. Elongate sleeve body 60 further includes a reaction wall 84 having conical injector clamping surface 76 formed thereon and extending transversely from cylindrical second sleeve end 70 to straight cylindrical wall 82. Reaction wall 84 is also understood to extend axially between injector clamping surface 76 and sleeve clamping surface 80. When installed in cylinder head casting 26 sleeve clamping surface 80 is in contact with upward facing middle deck surface 38, and reaction wall 84 transfers an injector clamping load to upward facing middle deck surface 38, as further described herein.

With focus on FIGS. 4 and 6, it can be noted reaction wall 84 may include an increased wall thickness relative to wall thicknesses of cylindrical second sleeve end 70 and straight cylindrical wall 82. It can also be noted from the drawings that outer sleeve surface 62 includes, upon reaction wall 84, a convex profile opposite to injector clamping surface 76, and a linear profile transitioning between the convex profile and straight cylindrical wall 82. It can also be noted that a convexity formed by reaction wall 84 is biased or bulged downwardly in the illustrated embodiment. A relief groove 86 may be formed in radially outward shoulder 78 and extends circumferentially around axis 66 at a location that is radially between sleeve clamping surface 80 and outer sleeve surface 62. Relief groove 86 is thus understood to be radially inward of sleeve clamping surface 80. Radially outward shoulder 78 may have a recurving hook shape in some embodiments, and protrudes radially outward of outer sleeve surface 62 relative to portions thereof located axially between shoulder 78 and first sleeve end 68 and axially between shoulder 78 and cylindrical second sleeve end 70. Cylindrical upper bore section 48, cylindrical middle bore section 54, and sleeve tip hole 52 may be successively stepped-in in diameter, in a direction of lower fire deck surface 36. It can further be noted from the drawings that upward facing middle deck surface 38 may be planar and intersected by a cylinder defined by cylindrical upper bore section 48. Upward facing middle deck surface 38 may also be located closer to lower fire deck surface 36 than to top deck surface 32. Fire deck 34 may also include a planar upward facing fire deck surface 88 extending circumferentially around sleeve tip hole 52. Reaction wall 84 may include a downward facing end surface 90, and a coolant clearance 92 extends axially between downward facing end surface 90 and upward facing fire deck surface 88. Coolant clearance 92 may also extend radially inward to cylindrical second sleeve end 70, thus enabling a flow of coolant conveyed through cylinder head casting 26 to exchange heat directly with reaction wall 84 and with cylindrical second sleeve end 70. As can be seen in FIG. 6, reaction wall 84 may be within a lower axial half 102 of injector sleeve 60, with an upper axial half 100 of injector sleeve 60 including first sleeve end 68.

Figure 5:
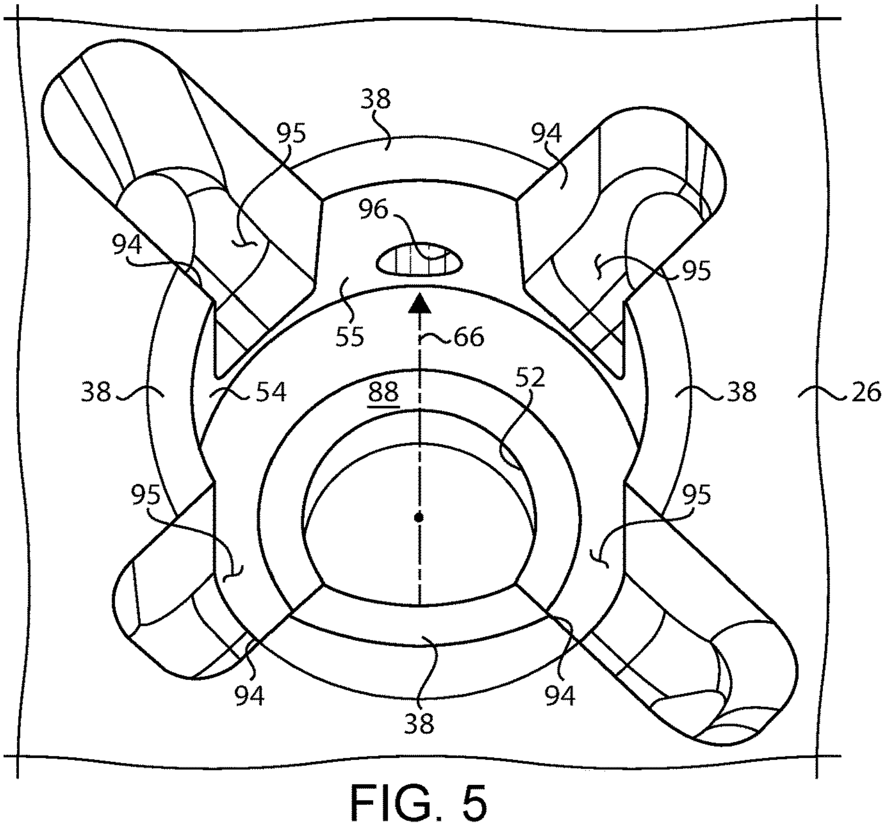
FIG. 5 is a perspective view of a portion of a cylinder head casting, according to one embodiment.

Referring now also to FIG. 5, upward facing middle deck surface 38 may extend circumferentially and discontinuously around axis 66. A plurality of coolant feed openings 94 may each be formed in part by discontinuities 95, or gaps, in upward facing middle deck surface 38 and fluidly connect cylindrical middle bore section 54 to coolant cavity 40. In an implementation, the plurality of coolant feed openings 94 include open-channel coolant feed openings 94. Cylinder head casting 26 may further include at least one closed-channel coolant feed opening 96 fluidly connected to cylindrical middle bore section 54 at a location axially between upward facing middle deck surface 38 and sleeve tip hole 52. As can be envisioned from FIG. 5 when fuel injector sleeve 60 is installed in contact with upward facing middle deck surface 38 discontinuities 95 may provide paths for engine coolant flow up and around fuel injector sleeve 60. Liquid engine coolant may be pumped or passively conveyed through the one or more closed-channel coolant feed openings 96 to flow around fuel injector sleeve 60 to exchange heat therewith, and then conveyed upwardly into upper regions of coolant cavity 40, for eventually flowing out of cylinder head casting 26 and to a radiator or other heat exchanger, eventually to be recirculated.

INDUSTRIAL APPLICABILITY

Figure 7:
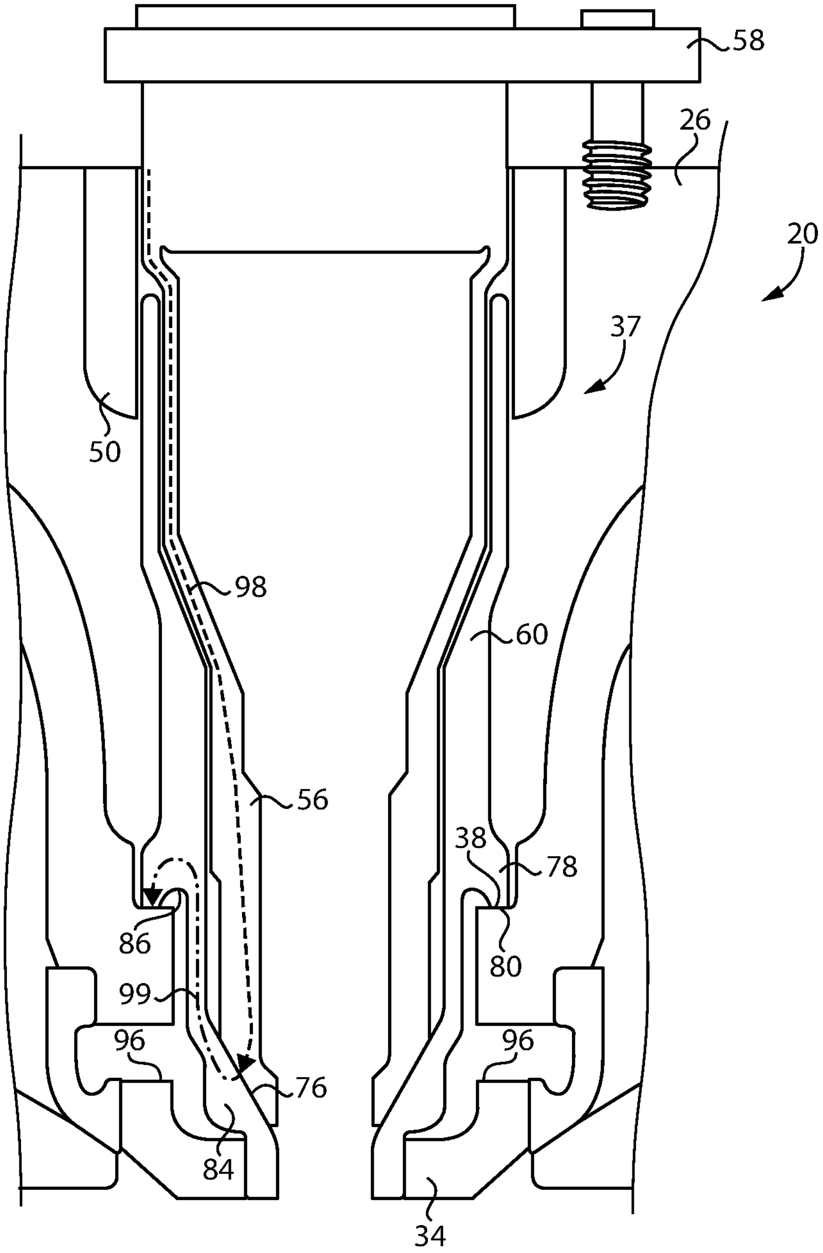
FIG. 7 is a side diagrammatic view of portions of a cylinder head assembly, according to one embodiment.

Referring to the drawings generally, but also now focusing on FIG. 7, there are shown portions of cylinder head assembly 20 where a fuel injector 56 is installed in fuel injector sleeve 60 and clamped in place by way of a so-called "crab" clamp 58 engaged with fuel injector 56 and attached to top deck surface 32, thereby applying a downward clamping load on fuel injector 56. As explained above, in certain prior strategies fuel injectors and/or fuel injector sleeves were often clamped in a cylinder head such that a clamping load on the fuel injector was reacted by way of the cylinder head fire deck. In FIG. 7, an example load path 98 is shown extending downwardly through fuel injector 58, and applied to injector clamping surface 76. A second example load path 99 is shown whereby it can be seen that the clamping load is reacted by reaction wall 84 axially and transversely upward to radially outward shoulder 78. It can further be appreciated that the injector clamping load is transferred through radially outward shoulder 78 downwardly to upward facing middle deck surface 38. Upward facing middle deck surface 38 may be part of or physically connected to middle deck 37 of cylinder head casting 26, and thereby enabling the injector clamping load to be redirected entirely out of fire deck 34.

During operation of an internal combustion engine employing power module 20, fuel injector 58 may be actuated, such as by way of rotation of a cam, to pressurize fuel, for example a liquid diesel distillate fuel, to a relatively high injection pressure. Fuel injector actuation, combustion of the injected fuel and air in the associated combustion chamber, and pressurization action of the associated piston pressurizing gases in the combustion chamber to an autoignition pressure, results in significant loading on both the fuel injector and the cylinder head itself. The rapidly changing pressures and other loads could in earlier strategies result in the fire deck deforming up and down almost akin to the membrane of a drum. According to the present disclosure the contribution to such loading that would have previously been made by the injector clamping load is reduced or eliminated entirely, enabling material of the middle deck region to react the injector clamping load, and limit the extent to which fire deck 34 is caused to deform. As a result, improved fatigue life is expected to be observed.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A cylinder head comprising:

a cylinder head casting including a top deck surface, a fire deck having a lower fire deck surface, and a middle deck, and the cylinder head casting having formed therein a coolant cavity extending around an exhaust conduit and an intake conduit each extending through the fire deck, and an injector bore;

the injector bore including a cylindrical upper bore section formed by an injector well extending downwardly from the top deck surface to the coolant cavity, a sleeve tip hole extending through the fire deck, and a cylindrical middle bore section extending upwardly from the sleeve tip hole and terminating at an upward facing middle deck surface, and the cylindrical middle bore section being formed by a cylindrical surface extending from an upward facing fire deck surface to the upward facing middle deck surface;

the upper bore section, the middle bore section, and the sleeve tip hole, are arranged coaxially about a bore center axis; and the upward facing middle deck surface extends circumferentially and discontinuously around the bore center axis, and a plurality of coolant feed openings are each formed in part by discontinuities in the upward facing middle deck surface and fluidly connect the middle bore section to the coolant cavity, wherein the plurality of coolant feed openings include open-channel coolant feed openings, wherein the cylinder head casting further includes at least one closed-channel coolant feed opening fluidly connected to the middle bore section at a location axially between the upward facing middle deck surface and the sleeve tip hole, wherein the open-channel coolant feed openings are four in number, and the at least one closed-channel coolant feed opening fluidly connects to the middle bore section at a location circumferentially between two of the open-channel coolant feed openings around the bore center axis.

2. The cylinder head of claim 1 wherein the at least one closed-channel coolant feed opening includes a first feed opening and a second feed opening positioned opposite the first feed opening circumferentially around the bore center axis.

3. The cylinder head of claim 2 wherein the first feed opening connects to a first passage extending to a first valve opening, and the second feed opening connects to a second passage extending to a second valve opening.

4. The cylinder head of claim 1 wherein the upper bore section, the middle bore section, and the sleeve tip hole are successively stepped-in in diameter, in a direction of the lower fire deck surface.

5. The cylinder head of claim 4 wherein the upward facing middle deck surface is planar and intersected by a cylinder defined by the upper bore section.

6. The cylinder head of claim 1 wherein the upward facing middle deck surface is located closer to the lower fire deck surface than to the top deck surface.

7. The cylinder head of claim 6 wherein an open clearance extends axially through the coolant cavity from the upward facing middle deck surface to the injector well.

8. The cylinder head of claim 1 wherein the fire deck includes an upward facing fire deck surface that is planar and extends circumferentially around the sleeve tip hole.

9. A cylinder head comprising:

a cylinder head casting including a top deck surface, a fire deck, and a middle deck, and the cylinder head casting having formed therein a coolant cavity extending around an exhaust conduit and an intake conduit each extending through the fire deck, and an injector bore;

the injector bore defining a bore center axis, and including an upper bore section formed by an injector well extending downwardly from the top deck surface to the coolant cavity, a sleeve tip hole extending through the fire deck, and a middle bore section formed in the middle deck;

the fire deck including an upward facing fire deck surface extending circumferentially around the sleeve tip hole;

the middle deck further including an upward facing middle deck surface located axially between the upward facing fire deck surface and the injector well; and the upward facing middle deck surface extending circumferentially around the bore center axis and having therein a plurality of discontinuities forming a plurality of closed-channel coolant feed openings connecting between the middle bore section and the coolant cavity; and the exhaust conduit and the intake conduit extend respectively to an exhaust opening and an intake opening in the fire deck, and the plurality of closed-channel coolant feed openings each extend to a different one of the exhaust opening and the intake opening.

10. The cylinder head of claim 9 wherein each of the upward facing middle deck surface and the upward facing fire deck surface is planar.

11. The cylinder head of claim 10 wherein an open clearance extends axially through the coolant cavity from the upward facing middle deck surface to the injector well.

12. The cylinder head of claim 9 wherein the fire deck includes therein a cylindrical sleeve tip hole, and the cylinder head casting includes a cylindrical surface formed in part in the fire deck and in part in the middle deck and extending from the upward facing fire deck surface to the upward facing middle deck surface.

13. The cylinder head of claim 12 wherein the plurality of closed channel coolant feed openings open in the cylindrical surface.

14. A cylinder head comprising:

a cylinder head casting including a top deck, a fire deck, and a middle deck, and having formed therein a coolant cavity and an injector bore defining a bore center axis;

the fire deck including an upward facing fire deck surface extending circumferentially around the injector bore, and having formed therein a plurality of coolant feed passages extending horizontally through the fire deck and converging upon the injector bore;

the middle deck including an exhaust conduit and an intake conduit extending vertically downward to the fire deck, and an upward facing middle deck surface extending circumferentially around the injector bore; and the middle deck including cast material forming the exhaust conduit, the intake conduit, and the upward facing middle deck surface, and the upward facing middle deck surface being positioned at an axially spaced location from the fire deck so as to react a downward clamping load on the upward facing middle deck surface via the cast material of the middle deck.

15. The cylinder head of claim 14 wherein the cast material is continuous in a horizontal direction from the upward facing middle deck surface to each of the exhaust conduit and the intake conduit.

16. The cylinder head of claim 14 wherein a plurality of open-channel coolant feed openings are formed in the upward facing middle deck surface and spaced circumferentially around the bore center axis.

* * * * *